(12) United States Patent
Takagi et al.

(10) Patent No.: US 10,111,402 B2
(45) Date of Patent: Oct. 30, 2018

(54) ANIMAL LITTER BOX (71) Applicant: UNICHARM CORPORATION, Ehime (JP)

(72) Inventors: Chiyo Takagi, Kanonji (JP); Shinya Kaneko, Kanonji (JP); Tomoko Hirao, Kanonji (JP); Nobuharu Namikawa, Toyama (JP)

(73) Assignee: UNICHARM CORPORATION, Ehime (JP)

( * ) Notice: Subject to any disclaimer, the term of this patent is extended or adjusted under 35 U.S.C. 154(b) by 144 days.

(21) Appl. No.: 14/895,824

(22) PCT Filed: May 27, 2014

(86) PCT No.: PCT/JP2014/064016
§ 371 (c)(1),
(2) Date: Dec. 3, 2015

(87) PCT Pub. No.: WO2014/196418
PCT Pub. Date: Dec. 11, 2014

(65) Prior Publication Data
US 2016/0113230 A1    Apr. 28, 2016

(30) Foreign Application Priority Data
Jun. 6, 2013 (JP) ................................. 2013-120266

(51) Int. Cl.
*A01K 1/01* (2006.01)
(52) U.S. Cl.
CPC .................................. *A01K 1/0114* (2013.01)
(58) Field of Classification Search
CPC .. A01K 1/0107; A01K 1/0114; A01K 1/0125; A01K 1/011
(Continued)

(56) References Cited

U.S. PATENT DOCUMENTS 2,741,223 A    4/1956 Winborn, Jr.
3,398,877 A *  8/1968 Jacobson ........... B65D 77/2092
                                                     220/266
(Continued)

FOREIGN PATENT DOCUMENTS

FR    2530923 A1    2/1984
JP    1-42456 Y2    12/1989
(Continued)

OTHER PUBLICATIONS

Extended European Search Report in EP Application No. 14808434.6, dated Apr. 15, 2016.
(Continued)

*Primary Examiner* — Monica L Williams
*Assistant Examiner* — Ebony E Evans
(74) *Attorney, Agent, or Firm* — Hauptman Ham, LLP (57) ABSTRACT

Provided is a litter box for animals in which a suitable amount of excretion treating agent can be determined visually. A litter box for animals is provided with a granule accommodating container that accommodates a plurality of granules. The granule accommodating container is provided with: a container main body, which has a lower surface part and a side wall part standing up from the peripheral edge of the lower surface part; and a protruding part, which has a protruding part lower surface, which sticks out toward the outside from the side wall part on the container main body and is curved at a prescribed angle with respect to the side wall part, and a protruding part side wall. The lower end part of the protruding part lower surface is positioned above the upper end part of the lower surface part.

12 Claims, 8 Drawing Sheets

(58) Field of Classification Search
USPC ....... 119/166, 162, 163, 164, 165, 167, 168, 119/169, 170
See application file for complete search history.

(56) References Cited

U.S. PATENT DOCUMENTS

| | | | |
|---|---|---|---|
| 4,111,157 A * | 9/1978 | Haugen | A01K 1/0107 119/165 |
| 4,646,684 A * | 3/1987 | Embry | A01K 1/0107 119/167 |
| D377,246 S * | 1/1997 | Clenney | 294/1.3 |
| 5,598,810 A | 2/1997 | Lawton, III | |
| 5,791,289 A | 8/1998 | Savicki | |
| 6,401,660 B1 | 6/2002 | Wolff | |
| 7,011,042 B2 * | 3/2006 | Martello | A01K 1/0107 119/165 |
| 7,204,202 B2 * | 4/2007 | Behun | A01K 5/0128 119/61.5 |
| 7,395,784 B2 | 7/2008 | Hirokawa et al. | |
| 9,107,381 B2 | 8/2015 | Matsuo et al. | |
| D772,493 S * | 11/2016 | Wu | D30/129 |
| 2001/0009142 A1 | 7/2001 | Otsuji et al. | |
| 2005/0115510 A1 * | 6/2005 | D'Anielo | A01K 1/0107 119/166 |
| 2005/0263088 A1 | 12/2005 | Martello et al. | |
| 2005/0263089 A1 | 12/2005 | Hirokawa et al. | |
| 2008/0314328 A1 * | 12/2008 | Johnson | A01K 1/0114 119/166 |
| 2009/0000558 A1 * | 1/2009 | Matsuo | A01K 1/0114 119/165 |
| 2012/0204800 A1 | 8/2012 | Beaudoin et al. | |
| 2013/0098301 A1 | 4/2013 | Matsuo et al. | |
| 2014/0283753 A1 * | 9/2014 | Dawn | A01K 1/0114 119/166 |
| 2016/0135420 A1 * | 5/2016 | Takagi | A01K 1/0114 119/166 |
| 2016/0251134 A1 * | 9/2016 | Takagi | A01K 1/0107 119/166 |

FOREIGN PATENT DOCUMENTS

| | | |
|---|---|---|
| JP | 2002-45067 A | 2/2002 |
| JP | 3640492 B2 | 4/2005 |
| JP | 2005-333939 A | 12/2005 |
| WO | 00/36906 A1 | 6/2000 |
| WO | 01/76356 A1 | 10/2001 |
| WO | 2011/162377 A1 | 12/2011 |

OTHER PUBLICATIONS

International Search Report dated Sep. 2, 2014, corresponding to International Application No. PCT/JP2014/064016.
Office Action in CN Application No. 201480031694.3, dated Oct. 30, 2017, 9pp.
Summons to attend oral proceedings in EP Patent Application No. 14808434.6, dated Nov. 3, 2017.

* cited by examiner

ANIMAL LITTER BOX

RELATED APPLICATIONS

The present application is a National Phase of International Application Number PCT/JP2014/064016, filed May 27, 2014, which claims priority to Japanese Application Number 2013-120266, filed Jun. 6, 2013.

TECHNICAL FIELD

The present invention relates to an animal litter box.

BACKGROUND ART

Heretofore, as an animal litter box for disposing excreta from an animal such as a cat, an animal litter box, which is configured of a lower container and an upper container that is arranged above the lower container, the upper container having liquid permeation holes on a bottom portion thereof, has been known. Such an animal litter box is used in a state in which a liquid absorbent member is placed on the lower container and a granular matter, so-called litter, is housed in the upper container (refer for example to Patent Document 1). According to the animal litter box disclosed in Patent Document 1, as the animal passes excreta on the granular matter, liquid such as urine passes through the granular matter and then the liquid permeation holes of the upper container, to be absorbed by the liquid absorbent member in the lower container.

Patent Document 1: Japanese Unexamined Patent Application Publication No. 2002-45067

DISCLOSURE OF THE INVENTION

Problems to be Solved by the Invention

However, the animal litter box disclosed in Patent Document 1 is not provided with an indicator on the container for indicating the amount of excreta disposal material. With the animal litter box with such a container, an appropriate amount of the excreta disposal material is not obvious. In case the excreta disposal material is excessively poured, it is likely to be scattered outside the container. In addition, adversely, it is not easy to notice a shortage of the excreta disposal material, which may hinder comfortable passing of excreta by an animal. A shortage of the excreta disposal material also causes feces to adhere to the container, leading to an unsanitary state and cumbersome cleaning.

An objective of the present invention is to provide an animal litter box allowing visual determination of an appropriate amount of an excreta disposal material.

Means for Solving the Problems (1) The animal litter box of the present invention includes a granular matter storing container in which a plurality of granular matter is stored. The granular matter storing container includes: a container main body having a bottom portion and a side wall portion that is upright from a peripheral portion of the bottom portion: and a protrusion portion having a protrusion bottom and a protrusion side wall. The protrusion portion bulges outward from the side wall portion of the container main body and being bent at a predetermined angle with respect to the side wall portion. A lower end of the protrusion bottom is positioned above an upper end of the bottom portion.

(2) The bottom portion preferably includes a tapered portion that is declivitous from the peripheral portion toward a center.

(3) The protrusion bottom is preferably configured of a slope face which is acclivitous toward an outside.

(4) A plurality of the protrusion portions is preferably provided.

(5) The container main body is formed in a rectangular shape in a plan view; and the plurality of protrusion portions is preferably provided along one side of the container main body.

(6) The animal litter box further includes a lower container that is arranged below the granular matter storing container. A plurality of through holes is preferably formed in the bottom portion.

(7) The bottom portion includes a planar portion that is arranged in a central part of the bottom portion and a tapered portion that is acclivitous from a periphery of the planar portion toward the side wall portion. The plurality of through holes is preferably formed in the planar portion.

Effects of the Invention

The present invention can provide an animal litter box allowing visual determination of an appropriate amount of an excreta disposal material.

PREFERRED MODE FOR CARRYING OUT THE INVENTION

Preferred embodiments of the animal litter box according to the present invention are explained hereinafter with reference to the drawings.

Figure 1:
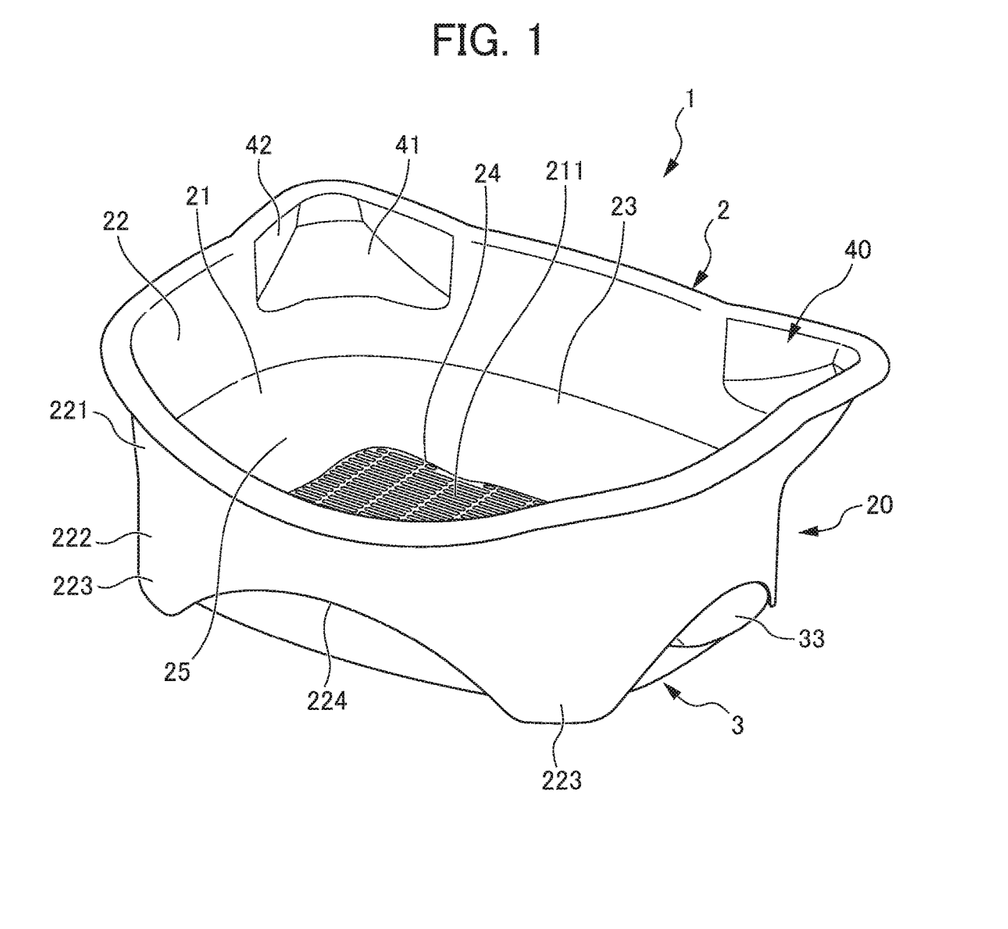
FIG. 1 is a perspective view illustrating an animal litter box according to the present embodiment.
Figure 2:
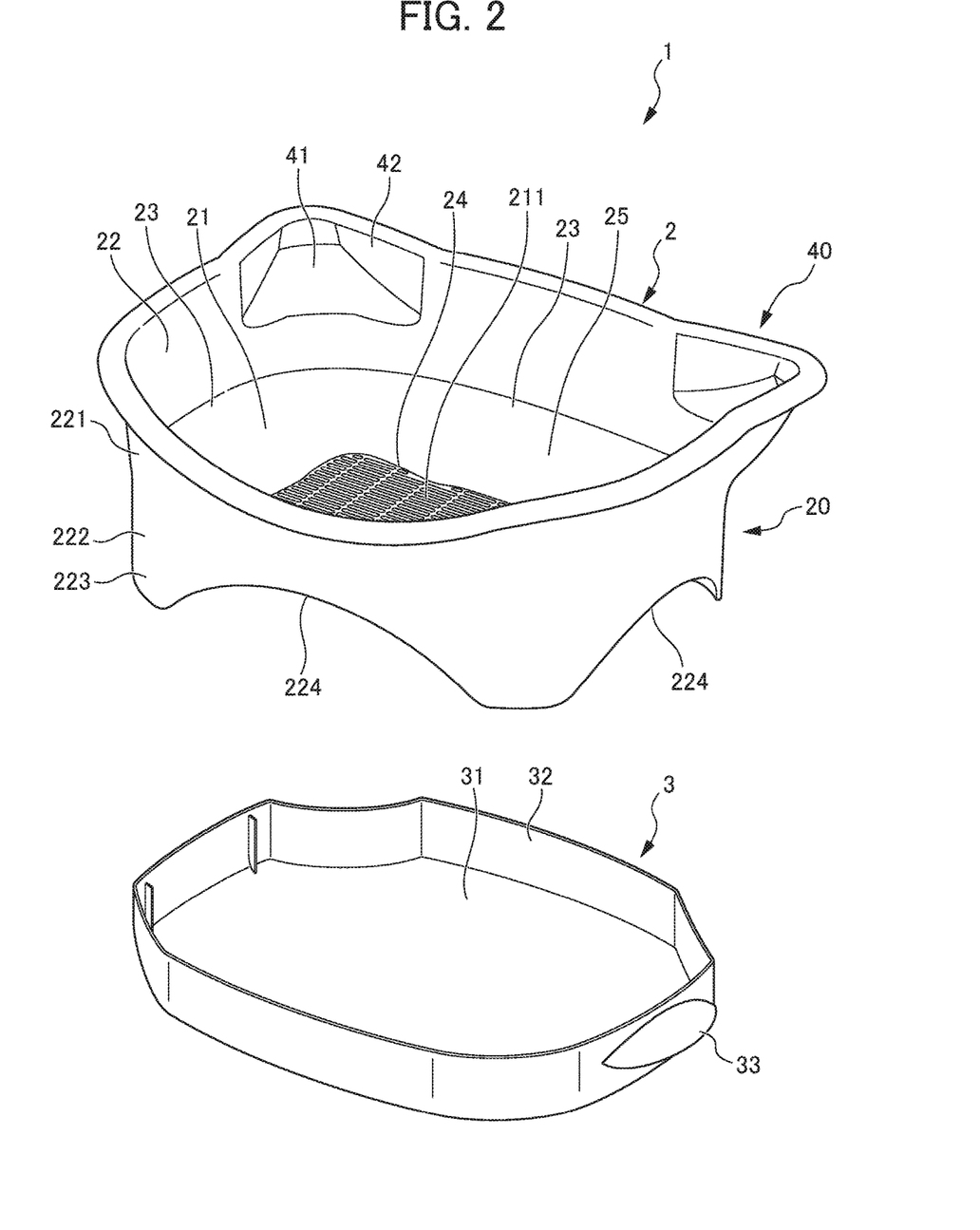
FIG. 2 is an exploded perspective view of the animal litter box according to the present embodiment.
Figure 3:
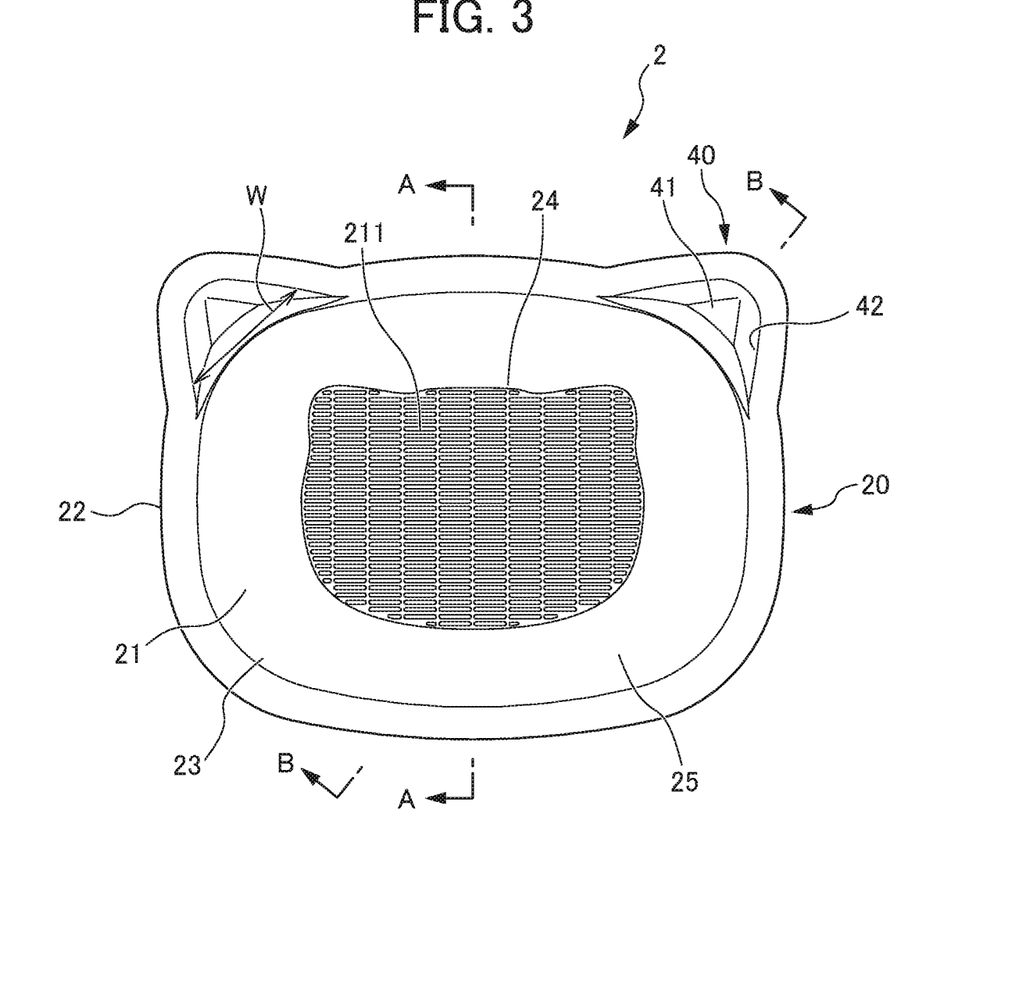
FIG. 3 is a front view of an upper container of the animal litter box according to the present embodiment.
Figure 4:
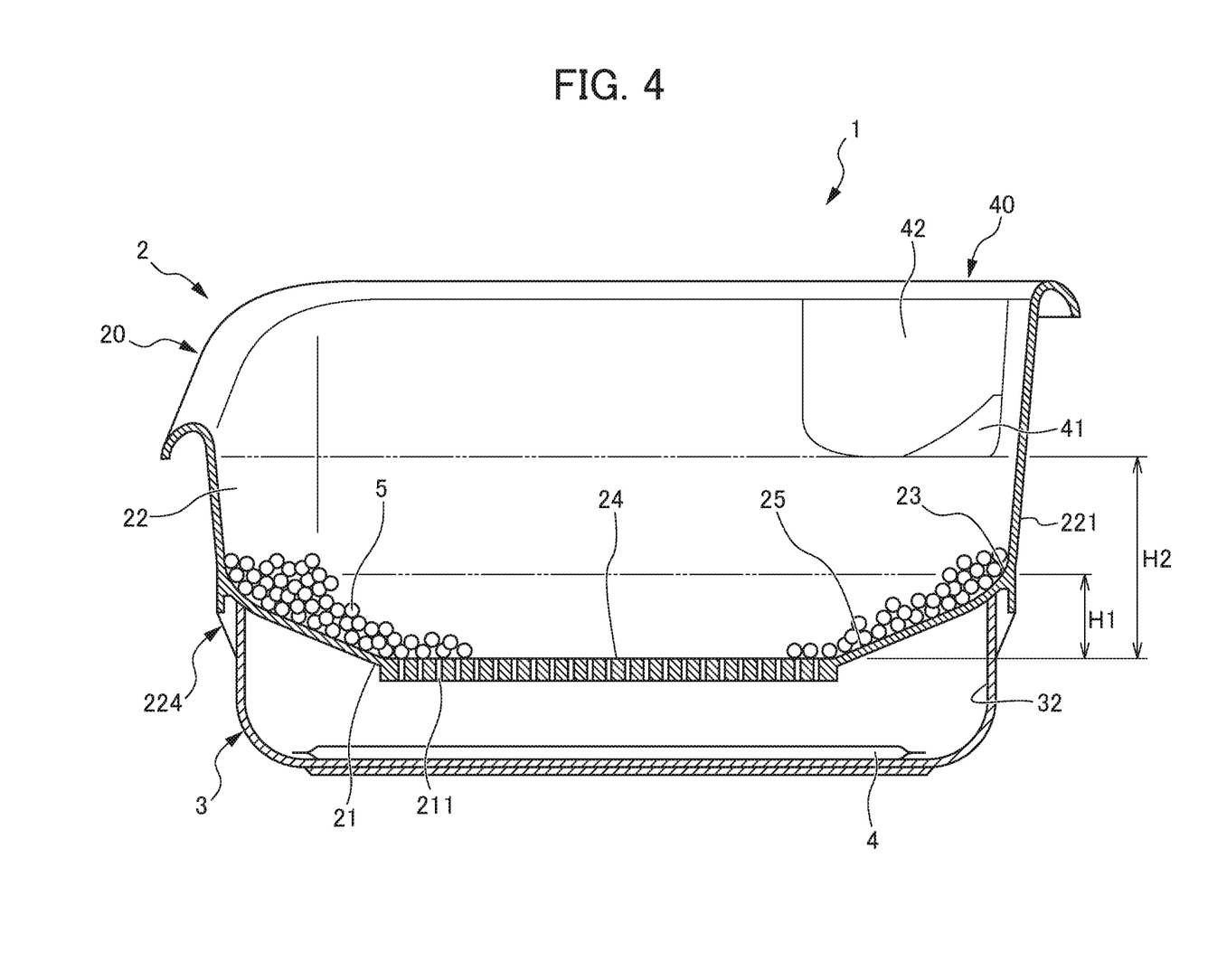
FIG. 4 is a cross-sectional view illustrating a usage state of the animal litter box of FIG. 3, taken along a line A-A.
Figure 5:
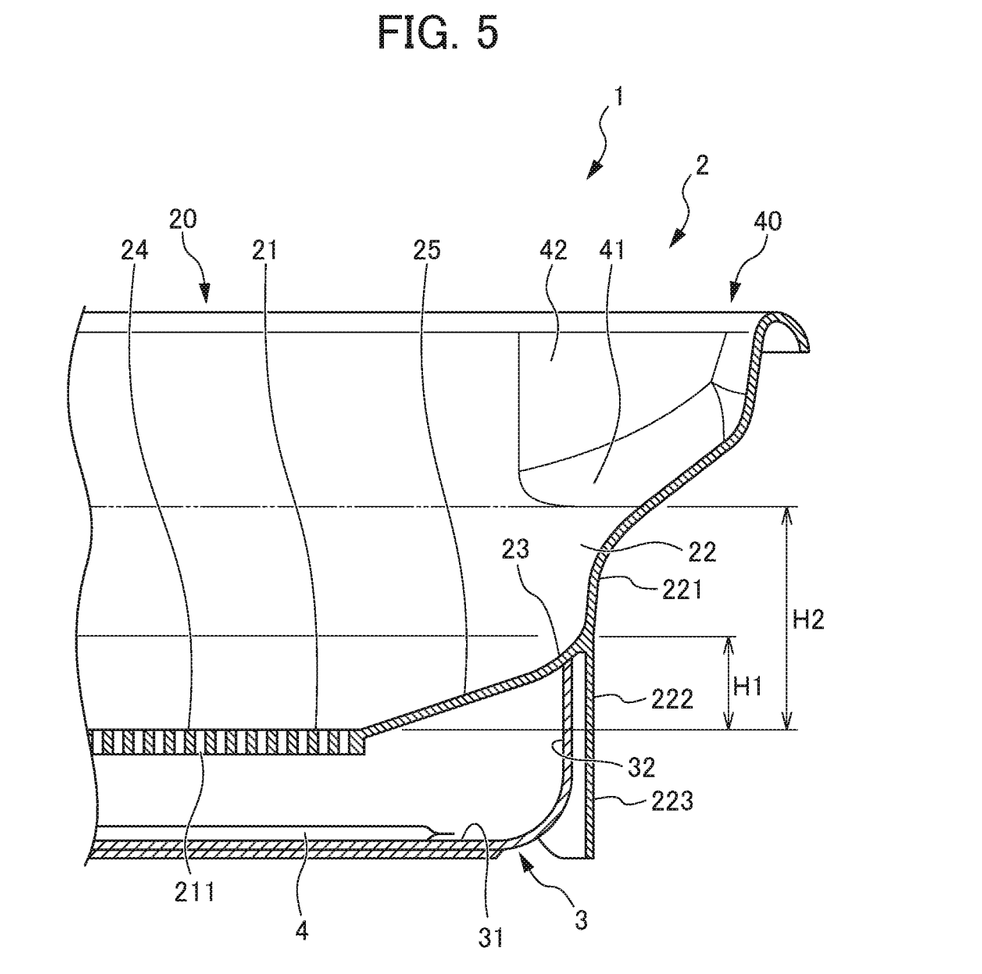
FIG. 5 is a partially enlarged cross-sectional view of the animal litter box of FIG. 3, taken along a line B-B.

FIG. 1 is a perspective view illustrating an animal litter box 1. FIG. 2 is an exploded perspective view of the animal litter box 1. FIG. 3 is a front view of an upper container 2 of the animal litter box 1. FIG. 4 is a cross-sectional view taken along a line A-A of the animal litter box 1 illustrated in FIG. 3, illustrating a state in which a liquid absorbent member 4 and an excreta disposal material 5 as the granular matter are respectively housed. FIG. 5 is a cross-sectional view of the animal litter box 1 illustrated in FIG. 3, taken in a direction B.

As illustrated in FIGS. 1 and 2, the animal litter box 1 includes an upper container 2 as the granular matter storing container and a lower container 3. The animal litter box 1 is installed on, for example, a floor of a living space.

The lower container 3 includes a lower bottom portion 31, a lower side wall portion 32, and a grip portion 33 as illustrated in FIG. 2. The lower container 30 is a container of which top portion is open, as illustrated in FIG. 2.

As illustrated in FIG. 4, the lower bottom portion 31 has a substantially octagonal shape, in which a rectangular shape with four corners being cut off obliquely with respect to each long side and each short side, in a plan view. The lower side wall portion 32 is a wall standing from a periphery of the lower bottom portion 31.

The grip portion 33 is arranged on an outer face of the lower side wall portion 32. The grip portion 33 is arranged at two positions face-to-face, one on each of short sides of the lower container 30. The grip portion 33 is provided to project outward from the lower container 30.

As illustrated in FIG. 2, the upper container 2 includes a container main body 20 and a projecting portion 40 that projects from the container main body 20. The upper container 2 is a container of which top portion is open.

The container main body 20 includes a bottom portion 21 and a side wall portion 22. The container main body 20 configures a major part of the upper container 2.

The bottom portion 21 includes a peripheral portion 23, a planar portion 24, and a tapered portion 25, as illustrated in FIG. 4.

The peripheral portion 23 is a portion in the vicinity of the periphery of the bottom portion 21 in plan view.

The planar portion 24 is arranged in a substantial center of the bottom portion 21 in a plan view, and is located at a lowermost position in a height direction of the bottom portion 21. The planar portion 24 is a face of the container main body 20 extending in a substantially horizontal direction. A plurality of through holes 211 is formed in the planar portion 24. The planar portion 24 has substantially the same shape as the outer shape of the upper container 2 that is a cat face shape in the present embodiment.

The tapered portion 25 is a face which is acclivitous from a periphery of the planar portion 24 toward the peripheral portion 23 of the bottom portion 21. The tapered portion 25 is a face which is declivitous from the peripheral portion 23 toward a substantial center. A taper angle of the tapered portion 25 is preferably 5 to 60 degrees with respect to the bottom portion 21. If a taper angle of the tapered portion 25 is too shallow as to be smaller than 5 degrees, it makes difficult for urine and the like of an animal to flow toward the planar portion 24 and drain to the lower container 3. If a taper angle of the tapered portion 25 is too steep as to be greater than 60 degrees, it results in a decreasing of the size of a space that an animal has to place its paws stably in the upper container 2 smaller. A taper angle within the above specified range is thus preferred. As illustrated in FIG. 4, the tapered portion 25 is formed across a height H1, which is in a range of 1 cm to 7 cm from the bottom portion 21 in a vertical direction.

The side wall portion 22 is upright from the peripheral portion 23 of the bottom portion 21 and configures an outer wall of the container main body 20. The side wall portion 22 includes an upper wall portion 221 and an extension wall portion 222.

A lower end of the upper wall portion 221 is continued from an upper end of the tapered portion 25. In other words, as illustrated in FIG. 4, the upper wall portion 221 is formed from a position that is spaced apart from the bottom portion 21 by the height H1. The upper wall portion 221 extends to an upper end of the upper container 2 and warps outward at the upper end.

The extension wall portion 222 extends downward from the upper wall portion 221 on an outer face side of the upper wall portion 221, as illustrated in FIG. 5. In addition, as illustrated in FIGS. 1 and 5, the extension wall portion 222 is positioned more to the outside than the lower container 3. Parts of the extension wall portion 222 at four corners of the upper container 2 extend to an installation surface of the animal litter box 1, thereby forming feet 223. As illustrated in FIG. 1, the extension wall portion 222 includes a cutout portion 224 that has been cut out to sweep upward, between the foot 223 and the foot 223.

The protrusion portion 40 is a part that bulges outward from the side wall portion 22 of the container main body 20. A plurality of protrusion portions 40 is provided along one side of the container main body 20. In the present embodiment, one protrusion portion 40 is provided at each end of a long side of the container main body 20.

The protrusion portion 40 includes a protrusion bottom 41 and a protrusion side wall 42. The protrusion portion 40 has a substantially triangular shape or a substantially fan-like shape, which looks like a cat ear.

The protrusion bottom 41 is configured of a slope face that is bent at a predetermined angle with respect to the side wall portion 22 of the upper container 2 and acclivitous toward the outside. As illustrated in FIG. 3, a width W of the protrusion bottom 41 is formed to gradually narrow upward. As illustrated in FIG. 4, a lower end of the protrusion bottom 41 is positioned above an upper end of the bottom portion 21.

The protrusion side wall 42 is a wall that extends from a periphery of the protrusion bottom 41 toward an upper end of the side wall portion 22. More specifically, the protrusion side wall 42 extends upward from two sides of the substantially triangular shape of the protrusion bottom 41 that are not in contact with the bottom portion 21.

As illustrated in FIGS. 4 and 5, the protrusion portion 40 is formed from a height H2, which is in a range of 2 cm to 8 cm from the bottom portion 21 in a vertical direction. In other words, the protrusion portion 40 bulges outward at a position 2 cm to 8 cm above the bottom portion of the upper wall portion 221 in a vertical direction.

The animal litter box 1 described thus far is used in a state in which the liquid absorbent member 4 is placed in the lower container 3 and the granular excreta disposal material 5 is housed in the upper container 2.

The liquid absorbent member 4 is, as illustrated in FIG. 4, a member that can absorb excreta, such as urine, from an animal. The liquid absorbent member 4 is a rectangular sheet in which a liquid permeable top sheet, a liquid retainable intermediate sheet, and a liquid impermeable back sheet are layered and joined.

The excreta disposal material 5 is a granular disposal material so-called litter, that absorbs excreta such as urine from an animal and make the excreta passed through. Granular matter of various materials, including one that is hydrophobic and lets through a large quantity of liquid to the liquid absorbent member and one that is solidified as it absorbs liquid such as urine, are used appropriately as the litter.

Figure 6A:
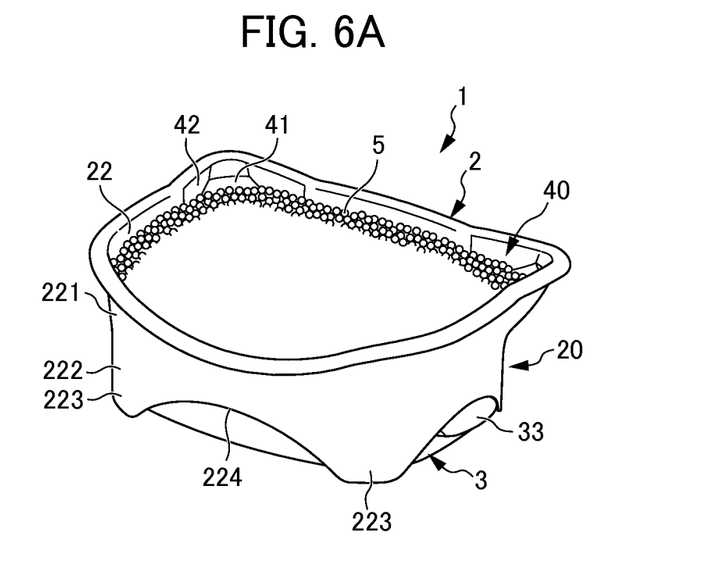
FIG. 6A is a diagram illustrating a usage state of the animal litter box according to the present embodiment.
Figure 6B:
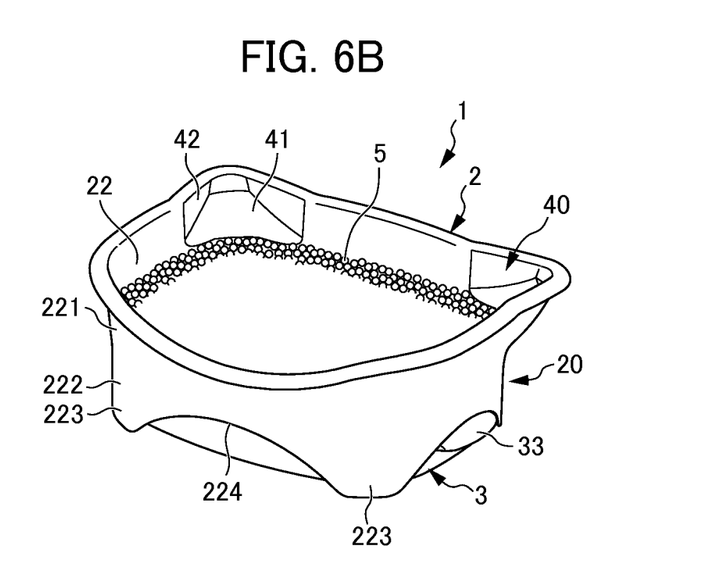
FIG. 6B is a diagram illustrating a usage state of the animal litter box according to the present embodiment.
Figure 6C:
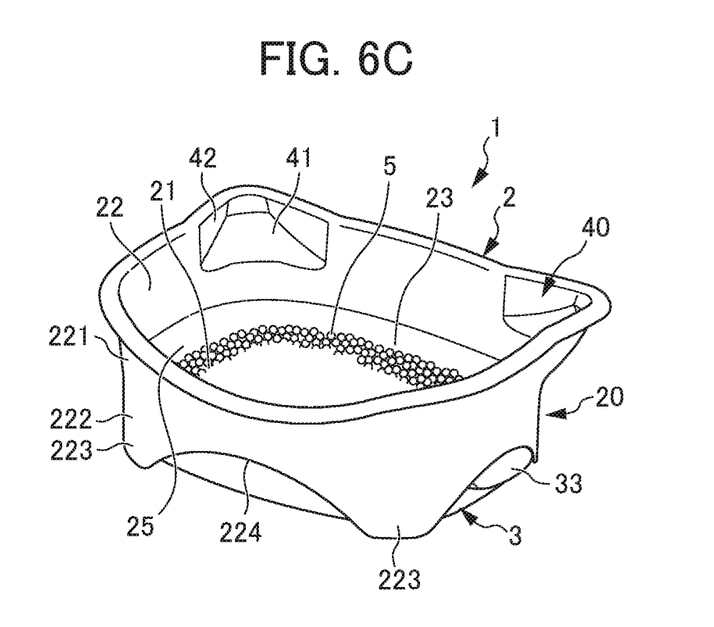
FIG. 6C is a diagram illustrating a usage state of the animal litter box according to the present embodiment.
Figure 7:
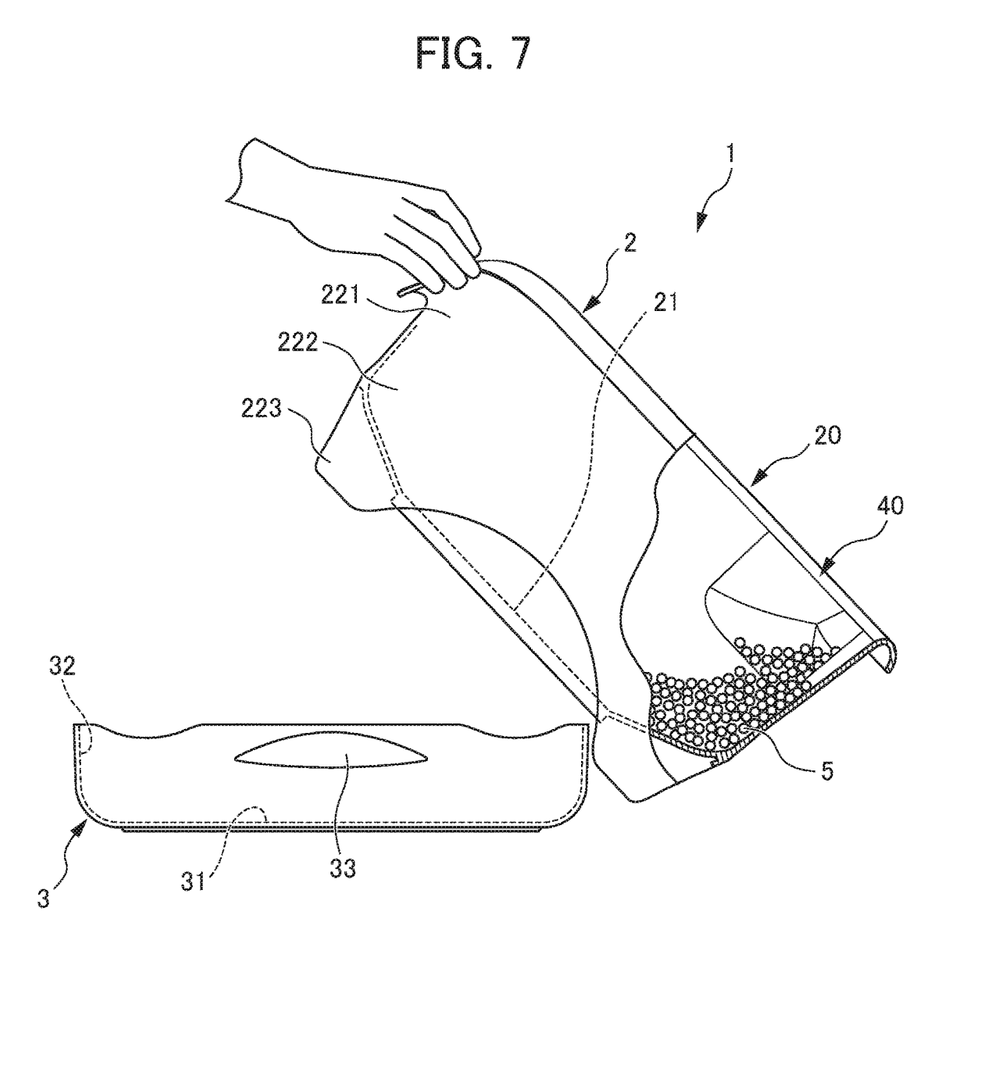
FIG. 7 is a diagram illustrating a state in which the upper container of the animal litter box according to the present embodiment is inclined.

A usage state of the animal litter box 1 is described hereinafter. FIGS. 6A to 6C is a diagram illustrating a usage state of the animal litter box 1. FIG. 7 is a diagram illustrating a state in which the animal litter box 1 is inclined.

As illustrated in FIG. 4, an animal such as a cat enters into the animal litter box 1 and urinates on the excreta disposal material 5 housed in the upper container 2. Liquid excreta such as urine passes through the excreta disposal material 5 and then the plurality of through holes 211 on the bottom portion 21, and is absorbed by the liquid absorbent sheet placed in the lower container 3.

FIG. 6A illustrates a state in which the excreta disposal material 5 is provided up to the protrusion bottom 41. From above the animal litter box 1, a user can visually recognize a state in which the excreta disposal material 5 is housed in the upper container 2 so as to cover the protrusion bottom 41. Since the animal has a habit of digging and agitating the excreta disposal material 5 after passing excreta, the excreta disposal material 5 poured up to the protrusion bottom 41 may be scattered outside the animal litter box 1. Given this, one can understand that the amount of the excreta disposal material 5 is too much when the excreta disposal material 5 is housed up to the protrusion bottom 41.

FIG. 6B illustrates a state in which the excreta disposal material 5 has been poured up to the vicinity of the lower end of the protrusion portion 40 (in other words, up to the height H2 shown in FIG. 4). From above the animal litter box 1, a user can visually recognize a state in which the excreta disposal material 5 has been poured up to the vicinity of the lower end of the protrusion bottom 41. In a state in which the excreta disposal material 5 has been poured up to the vicinity of the lower end of the protrusion portion 40, in the present embodiment, the amount of the excreta disposal material 5 being housed is, for example, about 4 liters. In such a state, the excreta disposal material 5 is not easily scattered by movement of the animal. A thickness from the bottom portion 21 is thus appropriate and allows comfortable passing of excreta by the animal. By using the lower end of the protrusion portion 40 as a guide, one can see an appropriate amount of the excreta disposal material 5.

FIG. 6C illustrates a state in which the excreta disposal material 5 has been poured to such a degree that the tapered portion 25 is visible (in other words, up to the range of height H1 shown in FIG. 4). From above the animal litter box 1, a user can visually recognize a state in which the excreta disposal material 5 has been poured to such a degree that the tapered portion 25 is visible. In a state in which the excreta disposal material 5 has been poured to such a degree that the tapered portion 25 is visible, in the present embodiment, the amount of the excreta disposal material 5 being housed is, for example, about 1 liter. In such a state, the amount of the excreta disposal material is not sufficient and it is difficult for the animal to dig and agitate the excreta disposal material after passing excreta, thereby hindering comfortable passing of excreta by the animal. In addition, it is more likely that feces adheres to the bottom portion 21. Given the above, one can see that replenishment of the excreta disposal material 5 is necessary when the height of the excreta disposal material 5 in the animal litter box 1 is lower than the upper end of the tapered portion 25 and in the vicinity of the height H1 of the side wall portion 22.

It should be noted that, by providing two protrusion portions 40 as illustrated in FIGS. 6A to 6C, a line connecting the two can be used as a guide for replenishment of the excreta disposal material 5.

As illustrated in FIG. 7, upon exchange of the liquid absorbent member 4 placed in the lower container 3 or checking the soiled state of the liquid absorbent member 4, the upper container 2 may need to be inclined. In such a situation, since the protrusion portion 40 bulges outward from the side wall portion 22 and is inclined at a predetermined angle with respect to the side wall portion 22, the excreta disposal material 5 flows into the protrusion portion 40 without falling outside the upper container 2 as the upper container 2 is inclined.

Even if the upper container 2 is further inclined from the state of FIG. 7, since the protrusion portion 40 projects outward from the side wall portion 22, the upper container 2 can be stably supported by the foot 223 and the protrusion portion 40.

The animal litter box 1 according to the present embodiment described thus far provides the following effects.

(1) In an animal litter box including the upper container 2 as a granular matter storing container in which a plurality of granular matter 5 is stored, the upper container 2 includes: the container main body 20 having the bottom portion 21 and the side wall portion 22; and the protrusion portion 40 having the protrusion bottom 41 and the protrusion side wall 42, the protrusion portion 40 bulging outward from the side wall portion 22 and being bent at a predetermined angle with respect to the side wall portion 22, and the lower end of the protrusion bottom 41 is positioned above the upper end of the bottom portion 21. Setting the height of the protrusion bottom 41 appropriately allows a user to easily visually recognize that a sufficient amount of the excreta disposal material 5 has been poured, once the excreta disposal material 5 as the granular matter being poured reaches the protrusion bottom 41. Since a step is provided between the protrusion portion 40 and the side wall portion 22, a guide for replenishment of the excreta disposal material 5 is easy to recognize.

(2) The tapered portion 25 that is declivitous from the peripheral portion 23 toward a center is provided on the bottom portion 21. Since the tapered portion 25 is provided on the bottom portion 21 of the upper container 2, the excreta disposal material 5 moves downward to gather. This can prevent the excreta disposal material 5 from being unevenly distributed on the bottom portion 21 and allow recognition of the appropriate amount of the excreta disposal material 5.

(3) The protrusion bottom 41 is configured of a slope face which is acclivitous toward the outside. This makes it easier to carry the excreta disposal material 5 to and from the container main body 20 via the protrusion bottom 41 upon pouring and exchange of the excreta disposal material 5, by virtue of slope of the protrusion bottom 41.

(4) A plurality of protrusion portions 40 is provided. This allows recognition of the amount of the excreta disposal material 5 in a horizontal direction, by comparing a height of the excreta disposal material 5 with a line connecting the protrusion portions 40.

(5) The shape of the container main body 20 is formed to be rectangular in plan view, and the plurality of protrusion portions 40 is provided along one side of the container main body 20. As a result, when the animal litter box 1 is held at the other side that is opposite to the one side and inclined, the upper container 2 is stably supported at the protrusion portions 40 and an inclined state can be maintained. This makes cleaning of the animal litter box 1 easier. In addition, when the container main body 20 is inclined from the other side, the excreta disposal material 5 flows into the protrusion portion 40 and can be prevented from falling outside the container main body 20.

(6) The lower container 3 that is disposed below the upper container 2 is provided, and the plurality of through holes 211 is formed in the bottom portion 21. Liquid such as urine having passed through the excreta disposal material 5 and then the through holes 211 on the bottom portion 21 is thus received by the lower container 3. If the liquid absorbent member 4 is placed on the lower container 3, the liquid such as urine can be absorbed by the liquid absorbent member 4.

(7) The bottom portion 21 is configured to include the planar portion 24 that is arranged in a central part of the bottom portion 21 and the tapered portion 25 that is acclivitous from a periphery of the planar portion 24 toward the side wall portion 22, and the plurality of through holes 211 is formed in the planar portion 24. The liquid such as urine having passed through the excreta disposal material 5 thus streams down the tapered portion 25 and gathers at the bottom portion 21, and can flow to the lower container 3 through the through holes 211 provided on the bottom portion 21.

The preferred embodiments of the present invention have been described; however, the present invention is not limited thereto and can be modified accordingly.

In the present embodiment, the guide of the appropriate amount of the excreta disposal material 5 is configured of the protrusion portion 40 and the tapered portion 25; however, the present invention is not limited thereto. For example, the guide can indicate the appropriate amount of the excreta disposal material 5 by means of different colors, concavity and convexity, patterns, etc.

In addition, the foot 223, which is arranged on the outer side of the lower container 3, is formed on the upper container 2; however, the foot 223 can also be formed to be arranged on the inner side of the lower container 3. With the foot arranged on the inner side of the lower container, the upper container 2 can be inclined forward while supported by the foot upon exchange of the liquid absorbent member 4.

Furthermore, the lower container 30 is shaped to have a substantially octagonal shape in the first embodiment; however, the shape of the lower container 30 is not limited to a substantially octagonal shape.

Moreover, the animal litter box 1 is a system litter box including the upper container 2 and the lower container 3; however, the present invention is not limited to a system litter box. The present invention can also be an animal litter box composed of a single container.

EXPLANATION OF REFERENCE NUMERALS

1 Animal litter box
2 Upper container (Granular matter storing container)
3 Lower container
20 Container main body
21 Bottom portion
211 Through hole
22 Side wall portion
23 Peripheral portion
24 Planar portion
25 Tapered portion
40 Protrusion portion
41 Protrusion bottom
42 Protrusion side wall

The invention claimed is:

1. An animal litter box, comprising:
   a granular matter storing container configured to store a plurality of granular matter, wherein
   the granular matter storing container includes:
      a container main body having a bottom portion and a side wall portion that is upright from a peripheral portion of the bottom portion in a height direction of the granular matter storing container; and
      protrusion portions spaced apart and discontinuous from each other, the protrusion portions each having a protrusion bottom and a protrusion side wall, the protrusion portions bulging away from the side wall portion of the container main body and being bent at a predetermined angle with respect to the side wall portion, and
   wherein
      the protrusion bottom inclines from a middle of the side wall portion upwardly in the height direction while being gradually distanced away from the side wall portion,
      an upper end edge of the container main body and upper end edges of the protrusion portions connect to each other to define an endless contour of a continuous upper end edge of the granular matter storing container,
      the endless contour of the continuous upper end edge of the granular matter storing container is exposed, and
      a lower end of the protrusion bottom is positioned above an upper end of the bottom portion in the height direction.

2. The animal litter box according to claim 1, wherein the bottom portion includes a tapered portion that is declivitous from the peripheral portion toward a center of the bottom portion.

3. The animal litter box according to claim 1, wherein the container main body is formed in a rectangular shape in a plan view of the granular matter storing container; and
   the protrusion portions are separately located along one side of the container main body.

4. The animal litter box according to claim 1, further comprising a lower container that is arranged below the granular matter storing container, wherein
   a plurality of through holes is formed in the bottom portion.

5. The animal litter box according to claim 4, wherein the bottom portion includes
   a planar portion that is arranged in a central part of the bottom portion and
   a tapered portion that is acclivitous from a periphery of the planar portion toward the side wall portion, wherein the plurality of through holes is formed in the planar portion.

6. The animal litter box according to claim 5, wherein the side wall portion includes
   an upper wall portion, and
   an extension wall portion continuously extending downward from the upper wall portion in the height direction of the granular matter storing container, and
   the extension wall portion includes
   cutouts opposing to each other, and
   feet spaced away from each other by the cutouts.

7. The animal litter box according to claim 6, wherein a lower end of the upper wall portion is continuous to an upper end of the extension wall portion and an upper end of the tapered portion.

8. The animal litter box according to claim 6, wherein the extension wall portion is disposed on an outer side of the lower container arranged below the granular matter storing container, and is spaced away from the lower container arranged below the granular matter storing container.

9. The animal litter box according to claim 6, wherein the extension wall portion extends beyond the bottom portion of the container main body in the height direction of the granular matter storing container to form the feet.

10. The animal litter box according to claim 1, wherein each of the protrusion portions includes a space defined by the inclined protrusion bottom and the protrusion side wall and configured to receive the granular matter when the granular matter storing container is inclined.

11. The animal litter box according to claim 10, wherein
   the protrusion side wall includes two opposing side surfaces in a direction crossing the height direction, and
   the protrusion bottom inclines from the middle of the side wall portion upwardly in the height direction while a distance between the two opposing side surfaces is gradually decreased.

12. The animal litter box according to claim 10, wherein the protrusion portions are positioned at a same height to indicate an amount of the granular matter by comparing a height of the granular matter with an imaginary line connecting the protrusion portions.

\* \* \* \* \*